United States Patent Office 3,639,503
Patented Feb. 1, 1972

3,639,503
BLOCK COPOLYCARBONATES CONTAINING POLYLACTONE BLOCKS AND CYCLO-BUTYLENE POLYCARBONATE BLOCKS
Markus Matzner, Edison, N.J., assignor to Union Carbide Corporation, New York, N.Y.
No Drawing. Filed Feb. 20, 1969, Ser. No. 801,152
Int. Cl. C08f 45/32; C08g 17/13, 39/10
U.S. Cl. 260—860
10 Claims

ABSTRACT OF THE DISCLOSURE

This invention relates to improved block copolycarbonates containing an amorphous, soft, rubbery segment or block composed of lactone units and another crystalline, hard, thermoplastic segment of block composed of cyclobutylene polycarbonate.

Block copolycarbonates of the general class to which the present invention is concerned are well known in the art. There have been a number of patents which have issued in the past few years on block copolycarbonates such, for example, as U.S. Goldberg Patent 3,161,615 and U.K. Patent 965,085. Among the many literature references relating to the general subject are "Elastomeric Polycarbonate Bolck Copolymers" by E. P. Goldberg, J. Polymer Sci., C4, 707 (1963); "Block Copolymers Based on 2,2-(4-hydroxyphenyl)-propane Polycarbonate," part I and part II, appearing respectively in J. Polymer Sci., 55, 343 (1961) and J. Polymer Sci., A3 2189 (1965).

An object of this invention is to provide an improved block copolycarbonate which has a highly desirable balance of properties, in particular good thermal stability at elevated temperatures, and excellent stability to ultraviolet light. Advantageously, the block copolymers of this invention do not require an annealing step in order to obtain the desired high temperature properties.

This invention relates to novel copolycarbonates which are block copolymers. Block copolymers are composed of at least two segments or blocks, at least one segment or block being of one type of unit or group (e.g. lactone units as in the block copolymers of this invention) and at least one other segment or block composed of a different type of unit or group (e.g. cyclobutylene polycarbonate units as in the block copolymers of this invention). Block copolymers can have linear, branched or cross-linked structures. The block copolymers of this invention are preferably essentially linear.

The block copolycarbonates of this invention comprise (1) divalent carbonate groups (i.e.

$$-O\overset{\overset{O}{\|}}{C}-O-)$$

(2) divalent polylactone moieties containing a plurality of lactone units represented by the formula:

(I) $\{CR_2{}^2\}_gCOO-$ wherein $R^2$ is selected from the class consisting of hydrogen and monovalent hydrocarbon groups free of unsaturation and having 1 to 18 carbon atoms inclusive and $g$ is an integer of 5 or 6; and, (3) divalent cyclobutylene moieties having the structures (II) 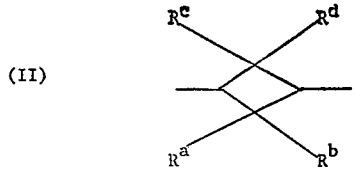

wherein $R^a$, $R^b$, $R^c$ and $R^d$ are either hydrogen or alkyl groups containing from one to four carbon atoms inclusive, each of at least some of said carbonate groups being attached to two cyclobutylene moieties, and each of at least some to. the carbonate groups linking one of said cyclobutylene moiety to one of said divalent polylactone moieties, the polylactone moieties being in an amount from about 50% to 80% by weight of the total composition.

Preferred block copolymers of this invention are represented by the formula:

(III)

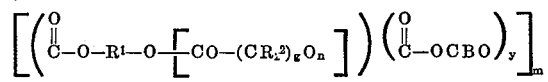

wherein $R^1$ is a divalent organic radical, preferably a divalent hydorcarbon (e.g. aliphatic) radical or two or more such divalent hydrocarbon radicals joined by either oxygen; and Wherein $R^2$ is selected from the class consisting of hydrogen and monovalent hydrocarbon groups free of aliphatic unsaturation and having 1 to 18 carbon atoms and $g$ is an integer of 5 or 6; and, Wherein CB is a divalent cyclobutylene group derived from a cyclobutanediol by removal of the hydroxy groups; and, Wherein $x$ and $y$ have values so that the relative weight of the polylactone blocks are 50 to 80% by weight and the divalent cyclobutylene polycarbonate blocks are 50 to 20 % by weight of the total composition; and, Wherein $n$ is an integer so that the molecular weight of the polylactone segment is in the range of 500 to 3,000; and, Wherein $m$ has a value so that the block copolymer has a reduced viscosity of at least .50 in chloroform (0.2 gram block copolymer/100 ml. solution at 25° C.); and, Wherein the block copolycarbonate has a glass transition temperature below 0° C. (preferably below −10° C.) and a tensile modulus of 100 p.s.i. at a temperature of at least 150° C. (preferably above 180° C.), said tensile modulus being referred to hereinafter as "$T_2$".

The block copolymers of this invention are useful in the same manner as the heretofore known block copolycarbonates (e.g., fibers, films, foils, conveyor belts, shoe soles, etc.). Other uses are as impact modifiers, tackifiers, plasticers, adhesives and binders.

The novel copolycarbonates of this invention may be prepared by any of the known methods for producing block copolycarbonates such, for example, as the ester exchange method, the interfacial method or the solution method disclosed in the article "Elastomeric Polycarbonate Block Copolymers" by Eugene P. Goldberg, Journal of Polymer Science, C4, 707 (1963).

The preferred method for the production of the block copolycarbonates of this invention is the known solution technique disclosed in the above referred to Goldberg article as well as U.S. Goldberg Patent 3,161,615 and my copending U.S. patent application Ser. No. 462,119 entitled "Preparation of Cyclobutanediol Polycarbonates by Direct Phosgenation" filed June 7, 1965. In this method, the appropriate diol reactants are incorporated in a suitable organic base such as a tertiary amine (e.g. pyridine, substituted pyridines such, for example, as 3-methyl pyridine, 4-methyl pyridine, 3-chloro pyridine and 4-chloro pyridine; dimethylaniline, quinoline, substituted quinolines such, for example, as 3-methyl quinoline, 4-methyl quinoline, 3-chloro quinoline and 4-chloro quinoline; etc.) and reaction effected with phosgene or a dibasic acid halide.

As pointed out in the U.S. Goldberg patent and my copending U.S. patent application entitled "Preparation of Cyclobutanediol Polycarbonates by Direct Phosgenation," Ser. No. 462,119, filed June 7, 1965, the base can be used undiluted or diluted with inert solvents, for example hydrocarbons such as benzene, toluene, xylene, etc., and halocarbons such as chloroform, chlorobenzene, methylene dichloride, etc. The use of tertiary amine as bases is advantageous in that they serve to catalyze the reaction, are good solvents, and act as acceptors for halogen acid given off during the reaction. The reaction proceeds satisfactorily over a wide range of temperatures, e.g. in the range of 80 to 150° C.

In employing the preferred solution technique, block copolycarbonates of this invention may be prepared by a direct one-step reaction of phosgene or any other dibasic acid halide with a cyclobutanediol and an appropriate hydroxyl terminated polylactone (molecular weight 500–3000) in an appropriate solvent (e.g. methylene chloride/pyridine solvent) or by a two-step technique wherein a bischloroformate of a cyclobutanediol is first formed and then reacted with more cyclobutanediol and the hydroxyl terminated polylactone, or a two-step process wherein both the bischloroformate of the cyclobutanediol and bischloroformate of the hydroxyl terminated polylactone are first formed and then reacted with more cyclobutanediol.

In all of the above-mentioned processes, the total number of moles of acid halide end groups must be approximately equal to the total number of hydroxy end groups. By employing the two-step techniques a block copolycarbonate of a more regular structure is formed.

In forming the block copolycarbonates of this invention, the carbonate precursor (e.g. phosgene) is used in an amount equal to at least the molar concentration of the cyclobutanediol and hydroxyl terminated polylacetone.

By the term "cyclobutanediol reactant" is meant the cyclobutanediol or mixture of cyclobutanediol with other aliphatic, aromatic or cycloaliphatic diols wherein the cyclobutanediol is present in a predominant amount.

The term "cyclobutanediol" is intended to include both cyclobutanediol per se and the alkyl substituted cyclobutanediols. The cyclobutanediols preferably have the hydroxyl substituents situated on opposing carbon atoms such as positions 1 and 3 on the cyclobutane ring. Such diols can be represented by the formula:

(IV)
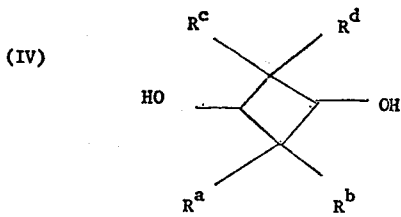

wherein $R^a$, $R^b$, $R^c$ and $R^d$ are either hydrogen or lower alkyl groups containing from one to four carbon atoms inclusive. In respect to the polymer produced it is most preferred to use 2,2,4,4-tetramethyl-1,3-cyclobutanediol as the predominant diol reactant. Accordingly this diol shall be used hereinafter as representative of useful cyclobutanediols. The diols have two geometric isomers, cis and trans. Their realtive amounts influence crystallinity, solvent resistance, and melting point of the corresponding polycarbonate (i.e. the hard block). The preferred cyclobutanediol contains 30 to 70% weight of the trans isomer.

While it has been indicated above that the predominant constituent of the diol reactant should be a cyclobutanediol, it will be appreciated that in the preparation of cyclobutane diol carbonate homopolymers, this diol constitutes the entire diol reactant. However, when cyclobutanediol carbonate copolymers are prepared then the cyclobutane diol constitutes at least fifty percent of the diol reactant. In the preparation of the carbonate copolymers, one or more other aliphatic, aromatic or cycloaliphatic diol co-reactants constitute the remainder of the diol reactant. Such diol co-reactants include those containing from 3 to 12 carbon atoms inclusive and those in which oxygen atoms have been substituted for carbon atoms in the chain or ring to provide ether diols, as are well known in the art.

Illustrative of the aliphatic diols which can be used as co-reactants are propanediol, butanediol, pentanediol, diethylene glycol, hexanediol, heptanediols, octanediols, decanediols, dodecanediols, triethylene glycol, and the like.

Illustrative of the aromatic diols are the dihydric phenols (e.g. bisphenol A and hydroquinone) disclosed in the Goldberg Pat. 3,161,615, as well as heterocyclic aromatic phenols like furanediol.

Illustrative of the cycloaliphatic diols which can be used as co-reactants are cyclopentanediol, cyclohexanediol, cyclohexanedimethanol, cyclohexanediethanol, bis-(hydroxyethoxy)cyclohexane, dipropylcyclohexanediol, and the like.

As indicated hereinbefore, the lactone units in the polylactone blocks of the block copolymers of this invention have the following structure:

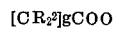

wherein $R^2$ is hydrogen or monovalent hydrocarbon as defined above and $g$ is an integer of 5 to 6. Illustrative of such lactone units are epsilon-caprolactone units, e.g., —[CH$_2$]$_5$COO—, monoalkyl epsilon-caprolactone units, e.g., —C(CH$_3$)H(CH$_2$)$_4$COO—,

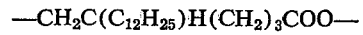

and the like, dialkyl espilon-caprolactones, e.g.,

—C(C$_2$H$_5$)HC(C$_2$H$_5$)H(CH$_2$)$_3$—COO—

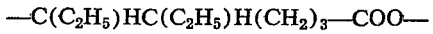, and the like, cycloalkyl, aryl, alkaryl and aralkyl epsilon-caprolactones, e.g., —(CH$_2$)$_2$—C(C$_6$H$_{11}$)H(CH$_2$)$_2$COO—,

—(CH$_2$)$_3$C(C$_6$H$_5$)HCH$_2$COO—

, and the like wherein $C_6H_{11}$ is cyclohexyl, $C_6H_5$ is phenyl and —CH$_2$C$_6$H$_5$ is benzyl.

The polylactone segments are provided, for example, by using as a reactant a polylactone diol represented by the formula:

(V) 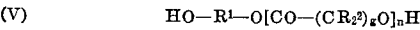

wherein $R^1$, $R^2$, $g$ and $n$ are the same as in Formula III.

The block copolycarbonates of this invention are high melting polymers possessing excellent elastomeric properties. Advantageously, no annealing step is required in order to obtain the desired high temperature properties because of the very rapid crystallization of the cyclobutylene carbonate segments.

Examples are now given for the preparation of the block copolycarbonates of this invention.

In Table I, which follows, there is summarized the preparation of block copolycarbonates (Examples 1–5) following the direct phosgenation method described in detail in Example 1. In Examples 4 and 5, the polylactone reactant is an extended diol formed by the reaction described hereinafter in Example A. Example 6 shows the preparation of block copolycarbonates of this invention by the dichloroformate route. Table II summarizes the preparation of additional block copolycarbonates (Examples 7–10) by the dichloroformate route. Table III summarizes the properties of a number of block copolycarbonates of this invention.

In my copending application entitled "Block Copolycarbonates Containing Polylactone Blocks and Dihydric Phenol Polycarbonate Blocks," S.N. 792,125, filed Jan. 17, 1969 there are disclosed polylactone diols which have been extended by reaction with a carbonate precursor (e.g. phosgene) and an appropriate amount of extender. Such extended polylactone diols may be used as the polylactone component for reaction with the cyclobutanediol in producing the block copolycarbonates of this invention.

In producing the above-mentioned extended diol, the molar concentration of the reactants are such that the resulting extended diol has a molecular weight in the range of 2,000 to 30,000, preferably 14,000 to 20,000, and the final block copolycarbonate produced from such extended diols has a reduced viscosity of at least about 0.7, e.g., at least about 0.7 and upwards to about 5, and higher, preferably from about 0.7 to about 2.3 or 3 and most preferably from about 1.2 to 1.6, in chloroform (0.2 gram block copolymer/100 ml. solution at 25° C.)

The extending agents used in accordance with the present invention are selected from the group consisting of dihydric phenols, aliphatic diols and dibasic organic acids and mixtures of the foregoing. Hence, the extended diols contain one or more of the following: dihydric phenol moieties, aliphatic diol moieties and dibasic acid moieties, the aforementioned moieties being divalent radicals obtained by removal of hydroxyl groups from the extending agent. The link between the divalent radical extender and the divalent polylactone residue is either a carbonate group or an ester group.

The extending agents may be saturated aliphatic, saturated cycloaliphatic or aromatic. The aliphatic and cycloaliphatic extenders may also contain olefinic unsaturation. Such unsaturation is for the following reasons:

(1) The extended diols can be vulcanized with sulfur to give cross-linked elastomers; and, (2) The extended diols can be used as a base resin in millable gum compositions; and, (3) The block copolycarbonates based on these extended diols can be cross-linked to give products having desirable solvent resistance. Generally, the extending agent has a molecular weight in the range of 60 to 2,000.

The dihydric phenol suitably employed as an extender includes any of the diphenol extending agents mentioned in my aforementioned copending application entitled "Block Copolycarbonates Containing Polylactone Blocks and Dihydric Phenol Polycarbonate Blocks," S.N. 792,125, filed Jan. 17, 1969. Examples of such dihydric phenols are those disclosed in Col. 2 and Col. 3 of U.S. Goldberg Pat. No. 3,223,677, the preferred dihydric phenol being bisphenol A.

The aliphatic diols that may be used as extenders include cycloaliphatic, straight and branched chain diols free of substituent groups reactive toward the other reactants of the reaction system. In general, these diols conform to the formula (VI)         HO—Y—OH in which Y can be an alkylene group such as ethylene, propylene, butylene, amylene, isoamylene, neopentylene and the like; an alkenylene group (—CH$_2$—CH=CH—CH$_2$—)

or two or more alkylene or alkylidene groups connected by a nonalkylene or nonalkylidene group such as an ether linkage, alkylene groups having pendant double bonds such as monoallyl ether of trimethylol propane:

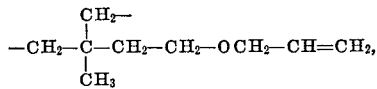

alkylene groups containing aromatic residues, a carbonyl linkage, a sulfur containing linkage such as sulfide, sulfoxide or sulfone, cycloaliphatic residue such as cyclopentyl, cyclohexyl, or a silicon-containing linkage such as silane or siloxy; and a cycloaliphatic group such as cyclopentylene and cyclohexylene. Substituent groups on the Y group can be halogen, nitro, cyano or aryl, but reactive groups such as hydroxyl (other than the two such groups necessarily present) amine, and carboxyl are to be avoided if cross-linking of the polymer is to be avoided.

The dibasic organic acids that may be used as extenders conform to the general formula:

(VII)         

In Formula VII, D represents either a hydroxyl or a carboxyl group, and G is an alkylene or alkylidene or group such as ethylene, propylene, propylidene, isopropylidene, butylidene, butylene, isobutylidene, amylene, isoamylene, amylidene, isoamylidene, neopentylene; a cycloaliphatic group such as cyclopentylene, or cyclohexylene; divalent hydrocarbon groups free of acetylenic unsaturation, an aromatic radical such as phenylene, naphthylene, biphenylene, substituted phenylene, etc.; two or more aromatic groups connected through nonaromatic linkages such as those defined by R$^1$ in Formula III; an aralkyl radical such as tolylene, xylylene, etc. G should be free of amine, hydroxyl and carboxyl groups, i.e., the acid of Formula VII should be a difunctional compound in the present reaction system. As used hereinafter the structure

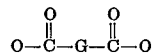

is termed the residue of a dicarboxylic acid, and the structure

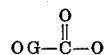

is termed the residue of a monohydroxymonocarboxylic acid.

Included within the scope of this invention are the saturated, aliphatic dibasic acid extenders derived from straight chain paraffin hydrocarbons, such as malonic, dimethyl malonic, succinic, glutaric, adipic, pimelic, suberic, azelaic and sebacic acid. Also included are the halogen-substituted aliphatic dibasic acids. Aliphatic carboxylic acids containing hetero atoms in their aliphatic chain, such as thio-diglycollic or diglycollic acid can also be used. Also useful are olefinically unsaturated acids as, for example, maliec or fumaric.

Examples of suitable aromatic and aliphatic-aromatic dicarboxylic acids which may be used as extenders are phthalic, isophthalic, terephthalic, homophthalic, o-, m-, and p-phenylenediacetic acid; the polynuclear aromatic acids such as diphenic acid, and 1,4 naphthalic acid, isopropylidene bisphenoxyacetic acid.

Examples of hydroxy acid extenders are the aliphatic hydroxy acids such as hydroxybutyric acid, glycollic acid and lactic acid. Examples of aromatic and aliphatic-aromatic hydroxy acids are mandelic acid, p-, m- and o-hydroxy benzoic acid. The hydroxy-substituted long-chain fatty acids, such as 12-hydroxystearic acid may also be used. Cycloaliphatic acids including tetrahydrophthalic, tetrahydroterephthalic, tetrahydroisophthalic, 3,6-endomethylenetetrahydrophthalic acid, hexachloro-3,6-endomethylenetetrahydrophthalic acid or camphoric acid may also be used.

The extended polyactone diols that may be used as reactants in producing the block copolycarbonates of this invention are difunctional hydroxy terminated stable materials. In producing the extended polylactone diols used as reactants in the present invention the same solution technique using direct phosgenation for producing the block copolycarbonates of this invention may be employed.

The reaction is generally carried out at a temperature in the range 0–30° C. Higher temperatures are preferably avoided because of undesirable secondary reactions that may occur at temperatures above 30° C.

In order to achieve the production of high molecular weight extended diols, it is necessay for the number of acid weight extended diols, it is necessary for tha number of acid halide groups to be approximately equal to the number of hydroxyl groups. Accordingly, with gaseous reactants such as phosgene which are difficult to control, in order to avoid and excess amount in the reaction, most of the gaseous reactant (but less than the stoichiometric amount) is passed rapidly in the reaction mixture with the remaining amount introduced slowly to bring the total amount in the reaction mixture to stoichiometric proportions.

By the above precautionary steps in introducing phosgene, an undesirable excess of phosgene is avoided. Generally an excess of any of the reactants reduces the molecular weight of the resulting product.

It has been found that in the production of extended diols by the solution technique using a tertiary base, the higher the amount of tertiary base, the more efficient is the phosgene utilization.

The ratio of polylactone diol to extender may vary. When extending agent is an aliphatic or cycloaliphatic compound the polylactone diol is in an amount from 0.1 to 10 moles per mole of extender. When the extender is an aromatic compound, the polylactone diol is in an amount from 1 to 10 moles per mole of extender.

Example A which follows relates to the preparation of an extended polylactone diol used as a reactant in accordance with the present invention.

EXAMPLE A

Preparation of the extended diol from polylactone III and polyether I (1.1 molar ratio)

Apparatus.—A 12-liter, round-bottomed flask equipped with a mechanical stirrer, reflux condenser, thermometer, and dry-argon and phosgene inlet-tubes. The argon is circulated over the reaction mixture; phosgene is bubbled into the mixture. The addition of phosgene was made from a tank placed on a solution balance.

Reagents.—Polylactone III: A hydroxyl-terminated poly ($\epsilon$-caprolactone) having a molecular weight of about 530 produced using diethylene glycol as a starter.

Polyether I: A polyethylene glycol having a molecular weight of about 200.

Methylene chloride: Dried over 4A molecular sieve.
Pyridine: Dried over 4A molecular sieve.
Phosgene: About 99% purety.

Experiment.—Into the flask were charged: 330 gms. (0.6226 moles) of Polylactone III, 124.52 gms. (0.6226 moles) of Polyether I, 5.61. $CH_2Cl_2$, and 625.4 ml. (7.7735 moles: 212.13 mole percent excess over the amount stoichiometrically required) of pyridine. The clear, practically colorless solution was cooled to about 4° C. Addition of phosgene at a rate of about 3 gms. $COCl_2/2$ minutes (12.1 mmole percent/min.) was started. Approximately 101 gms. of phosgene (about 82% mole) were added at this rate (addition time: 72 minutes). During this period of time the temperature rose to about 30° C.; the mixture was cooled to 11° C., and the slow addition of phosgene (rate: 4 g. per 10 min. or 3.2 mmole percent/min.) started. It was continued until a total of 139 gms. (12.5 mole percent nominal excess over the amount required) of phosgene was added (excess of phosgene is nominal due to losses of this gaseous reagent). A white precipitate of pyridine hydrochloride formed; the temperature of the reaction mixture rose to 26.5° C. at the end of the phosgenation. The reaction solution was very light pink.

The excess of pyridine was neutralized with a solution of 438 ml. conc. hydrochloric acid in 2 liters of distilled water. The pink color disappeared on neutralization and a very light yellow organic layer was obtained. The two-phase, aqueous acid/methylene chloride solution, system was stirred for 1 hr. and then decanted. The organic layer was given a series of water-washes until the aqueous layer was at the end of the wash. Total number of washes required: 4: each wash: 2 liters of distilled water; stirring times were 0.5 hr. for the first three, and 1 hr. for the last wash. Emulsions formed on washings and were broken by the addition of variable amounts of methanol.

The organic layer was dried over magnesium sulfate, filtered and evaporated. The yellow, clear, viscous residue was then dried till constant weight at about 60° C. under house vacuum. It was considered as being at constant weight when its weight loss over 24 hrs. under the drying conditions mentioned above was lower than 0.05%.

The yield of residue was 96.1%; RV($CHCl_3$, 25° C.; 0.2 g./100 ml.)—0.49.

EXAMPLE I

Preparation of a 60/40 by weight block copolycarbonate from cyclobutanediol I and polylactone I.

(1) Cyclobutanediol I (or TMCBD) is a 2,2,4,4-tetramethylcyclobutanediol-1,3. Contains 39.6% trans isomers by N.M.R.

(2) Polylactone I is a hydroxyl-terminated poly ($\epsilon$-caprolactone) of molecular weight about 2,000. Diethylene glycol was used as the polymerization initiator ($R^1 = CH_2CH_2OCH_2—CH_2—$).

(3) Percentages (60/40) are based on the total charge of reactants expressed as "diols."

Reagents—

Cyclobutanediol I—39.6% trans isomer by N.M.R.
Polylactone I—molecular weight about 2,000 U.C.C.
Toluene, pyridine—dried over 4A molecular sieves.
Phosgene—98%+purity.

Note.—The amounts used in the polymerization are such that the diol composition of the final block copolymer is:

60% weight Polylactone I.
40% weight Cyclobutanediol I.

Apparatus.—A 500 ml. flask equipped with a stirrer, reflux condenser, thermometer, phosgene and argon inlet-tubes. The inert gas is circulated above the reaction mixture; phosgene is added into the mixture.

Experiment.—Into the flask are charged 18 grams (0.009 moles) of Polylactone I, 12 grams (0.08321 moles) of Cyclobutanediol I, 180 ml. of toluene and 120 ml. of pyridine. Stirring and circulation of dry argon are started. The mixture is heated to reflux and kept at reflux for about 5 minutes. It is cooled to 25° C. and rapid addition of phosgene is started. Within 15 minutes, 6.84 grams of phosgene (75%) are added to the mixture. The latter is slightly pink and contains a voluminous white precipitate (pyridine hydrochloride). The temperature is 50° C. The rate of phosgene addition is decreased. Approximately 1.824 grams (20%) of the phosgene are added within 40 minutes. Heating is applied during that period and the temperature reaches 90° C. The rate is again decreased and the remaining 5% of the phosgene (0.456 gram) are added within 25 minutes while the temperature reaches 110° C. At this point the mixture is yellow and very viscous. It is cooled and filtered. The filtrate is coagulated in 5 times its volume of methanol. A white fluffy polymer is obtained. It is washed twice with methanol and twice with distilled water. Each washing: about 1.5 liter of solvent; about 5 minutes of vigorous stirring in a large Waring Blendor.

All of the other block copolycarbonates listed in Table I are prepared by a similar procedure.

TABLE I

| | Poly ($\epsilon$-caprolactone) | | TMCBD | |
|---|---|---|---|---|
| Example | Type [1] | Percent wt. | Type [2] | Percent wt. |
| 1 | Polylactone I | 60 | 39.6 | 40 |
| 2 | Polylactone II | 60 | 42 | 40 |
| 3 | Polylactone I | 50 | 35 | 50 |
| 4 | Extended diol of Example A | 60 | 35 | 40 |
| 5 | do | 55 | 35 | 45 |

[1] Polylactone I, Polylactone II and Polylactone III are dihydroxyl terminated poly ($\epsilon$-caprolactones) of molecular weights 2,000, about 850 and about 530, respectively produced using diethylene glycol as a starter.
[2] Percent trans isomer by N.M.R.

EXAMPLE 6

(1) Preparation of a block-copolycarbonate from cyclobutane diol I (TMCBD) and polylactone I Reagents:

Polylactone I
Toluene dried over 4A molecular sieve.
Pyridine dried over 4A molecular sieve.

Cyclobutane diol dichloroformate, polymerization grade containing 52.2% trans isomer.
Cyclobutane diol I containing 50.8% trans isomer.

Note.—The amounts used in this polymerization were such that the composition of the final block copolymer be as follows:

wt. percent: Polylactone I=60%; TMCBD=40%.
mole percent: Polylactone I=9.22%, TMCBD=90.23%.

The molar ratio TMCBD dichloroformate/combined diols was equal to 100/98 due to the purity of the starting dichloroformate.

Experiment.—Into a flask (250 ml.) equipped with a magnetic stirrer, reflux condenser, dropping funnel and an argon inlet-tube (the inert gas being circulated over the reaction mixture) were placed 5.3826 gms. (0.02 m.) of TMCBD dichloroformate, 2.2684 g. (0.01573 m.) of TMCBD, 7.7129 gms (0.0038 m. of Polylactone I), and 40 ml. toluene. Magnetic stirring and circulation of dry argon were started. A solution of 3.48 gms. (0.044 m.) pyridine in 50 ml. toluene was prepared and placed in the dropping funnel. The mixture in the flask was heated. At about 85–90° C. solubilization occurred. The solution was brought to reflux and kept at reflux for about 5 minutes. It was then cooled to about 95° C.; addition to the pyridine solution in toluene was started. A strong exotherm was observed. A white precipitate (presumably the pyridine-dichloroformate complex) formed in the flask. After completion of the pyridine-toluene addition (6 minutes), the mixture was again heated to reflux and kept at reflux for 20 hours. During the heating period, the mixture became gradually a water-white, clear, viscous polymer solution; a "sublimate" of pyridine hydrochloride collected on the upper inner walls of the reaction flask. The mixture was cooled and coagulated in about 1L. $CH_3OH$. A white, fibrous polymer fluff was obtained. The fluff was washed with methanol and distilled water. Two methanol and two distilled water washes were given. Each wash: about 1.5 L. solvent; about 5 minutes of vigorous stirring in a large Waring Blendor. Yield: 90.6%: RV(CHCl₃, 25° C.; 0.2 g./100 ml.)=1.02.

All of the other block copolycarbonates listed in Table II are prepared by a similar procedure.

In Tables II and III appearing hereinlater a number of abbreviations are used. The abbreviations are now given followed by the full names.

RV—Reduced viscosity
Mod.—Modulus
Str.—Strength
Elong.—Elongation
P. Imp.—Pendulum impact
$T_g$—Glass transition temp.

Reduced viscosity (RV) is determined by dissolving a 0.2 gram sample of polymer in chloroform in a 100 ml. volumetric flask so that the resultant solution measures exactly 100 ml. at 25° C. in a constant temperature bath. The viscosity of 3 ml. of the solution which has been filtered through a sintered glass funnel is determined by a viscometer at 25° C. Reduced viscosity values are obtained from the equation:

$$\text{Reduced viscosity} = \frac{t_s - t_o}{c \cdot t_o}$$

wherein:
$t$ is the efflux time of the pure solvent
$t_s$ is the efflux time of the polymer solution
$c$ is the concentration of the polymer solution expressed in terms of grams of polymer per 100 ml. of solution In Table III $T_2$—temperature at which tensile modulus is 100 p.s.i.
$T_3$—temperature at which tensile modulus is 1000 p.s.i.
$T_4$—temperature at which tensile modulus is 10,000 p.s.i.

TABLE II.—BLOCK COPOLYCARBONATES FROM CYCLOBUTANEDIOL I (TMCBD) AND POLYLACTONE I [1]

| Example No. | Polylactone I Percent wt.[2] | Polylactone I Percent mole[2] | TMCBD Percent wt.[2] | TMCBD Percent mole[2] | Polymer[3] Yield, percent | RV[4] |
|---|---|---|---|---|---|---|
| 6 | 60 | 9.77 | 40 | 90.23 | 99.6 | 1.02 |
| 7 | 65 | 11.84 | 35 | 88.16 | 88.8 | 0.91 |
| 8 | 55 | 8.11 | 45 | 91.89 | 87.4 | 0.94 |
| 9 | 50 | 6.74 | 50 | 93.26 | 88.2 | 1.01 |
| 10 | 45 | 5.58 | 55 | 94.42 | 86.8 | 0.93 |

[1] Polylactone I is a polycaprolactone of mol. wt about 2,000, prepared by polymerization of ε-caprolactone in the presence of diethylene glycol as initiator. The sample used in this work has a molecular weight of 1,993.
[2] Percentages based on total charge of reactants expressed as "diols."
[3] All polymers prepared by the "dichloroformate" route, i.e. by reaction of TMCBD dichloroformate with TMCBD and Polylactone I in toluene solvent and in the presence of pyridine as catalyst. Reaction time: 20 hours. All final polymer solutions were water-white. The TMCBD reactants contained about 50% trans isomer.
[4] All RV's in CHCl₃, at 25° C. (0.2 g./100 ml.).

TABLE III.—PROPERTIES OF THE BLOCK-COPOLYCARBONATES FROM TMCBD AND POLYLACTONE I

| Example No. | Polylactone I Percent wt. | Polylactone I Percent mole | TMCBD Percent wt. | TMCBD Percent mole | Mold temp. (° C.) | RV | Tensile—(p.s.i.) Mod. | Tensile—(p.s.i.) Str. | Elong. Percent | P. Imp. Ft. lbs./in.[2] | $T_g$ | $T_4$ | $T_3$ | $T_2$ |
|---|---|---|---|---|---|---|---|---|---|---|---|---|---|---|
| 7 | 65 | 11.84 | 35 | 88.16 | 160 | 0.85 | 1,400 | 1,850 | 760 | | <25 | | 50 | 125 |
| 6 | 60 | 9.77 | 40 | 90.23 | 160 | 0.81 | 1,800 | 1,500 | 400 | | <25 | <25 | 50 | 135 |
| 8 | 55 | 8.11 | 45 | 91.89 | 160 | 0.83 | 2,200 | 2,400 | 450 | | <25 | <25 | 70 | 165 |
| 9 | 50 | 6.74 | 50 | 93.26 | 160 | 0.99 | 4,400 | 4,400 | 400 | | <25 | | 120 | 190 |
| 10 | 45 | 5.53 | 55 | 94.42 | 160 | 0.92 | 9,000 | 3,700 | 260 | | <25 | | 165 | 200 |

The block copolycarbonates of this invention have excellent elastomeric properties and do not require any annealing step, since the "hard" cyclobutylene carbonate blocks are crystalline directly after molding. The polymers have excellent thermal stability. Their ultraviolet stability is excellent as well.

What is claimed is:

1. A film forming block copolycarbonate consisting essentially of (1) carbonate groups having the formula

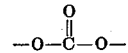

(2) divalent polylactone moieties containing a plurality of lactone units represented by the formula (I)  [CR₂]$_g$ COO— wherein $R^2$ is selected from the class consisting of hydrogen and monovalent hydrocarbon groups free of unsaturation and having 1 to 18 carbon atoms inclusive and $g$ is an integer of 5 or 6; and, (3) divalent cyclobutylene moieties derived from a cyclobutanediol by removal of the hydroxy groups, said cyclobutylene moieties having the structures (II) 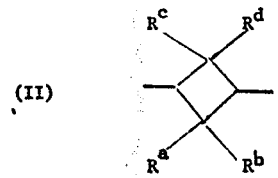

wherein $R^a$, $R^b$, $R^c$ and $R^d$ are either hydrogen or alkyl groups containing from one to four carbon atoms inclusive, each of at least some of said carbonate groups being attached to two cyclobutylene moieties, and each of at least some of the carbonate groups linking one of said cyclobutylene moieties to one of said divalent polylactone moieties, the polylactone moieties being in the amount from about 50 to 80% by weight of the total composition and said cyclobutylene moieties and the carbonate groups linking said cyclobutylene moieties, taken together, being present in an amount from about 50 to 20% by weight of the total composition.

2. Film-forming block copolymers represented by formula:

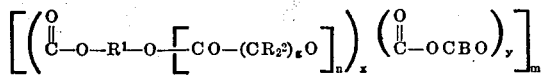

wherein $R^1$ is a divalent organic radical; and, wherein $R^2$ is selected from the class consisting of hydrogen and monovalent hydrocarbon groups free of aliphatic unsaturation and having 1 to 18 carbon atoms and $g$ is an integer of 5 or 6; and, wherein CB is a divalent cyclobutylene group derived from a cyclobutanediol by removal of the hydroxy groups; and, wherein $x$ and $y$ have values so that the relative weight of the polyaceton blocks ar 50 to 80% by weight and the divalent cyclobutylene polycarbonate blocks are 50 to 20% by weight of the total composition; and, wherein $n$ is in an integer so that the molecular weight of the polylactone segment is in the range of 500 to 3,000; and, wherein $m$ has a value so that the block copolymer has a reduced viscosity of at least .50 in chloroform (0.2 gram block copolymer/100 ml. solution at 25° C.); and, wherein the block copolycarbonate has a glass transition temperature below 0° C. and a tensile modulus of 100 p.s.i. at a temperature of at least 150° C.

3. A block copolymer according to claim 2 wherein $R^1$ is a divalent hydrocarbon radical.

4. A block copolycarbonate according to claim 1 wherein the cyclobutylene moieties $R^a$, $R^b$, $R^c$ and $R^d$ are methyl.

5. A block copolycarbonate according to claim 1 wherein the value of lactone unit $g$ is 5.

6. A block copolycarbonate according to claim 1 wherein the polylactone moiety contains one or more extender moieties selected from the group consisting of dihydric phenol moieties, aliphatic diol moieties, hydroxy monocarboxylic acid moieties and dicarboxylic moieties.

7. A block copolycarbonate according to claim 2 wherein $R^1$ is two alkylene radicals linked by an ether oxygen.

8. A block copolycarbonate according to claim 2 wherein $R^1$ is —$CH_2CH_2OCH_2CH_2$—.

9. A block copolycarbonate according to claim 2 wherein the molecular weight of each polylactone block is about 2000.

10. A block copolycarbonate according to claim 2 wherein at least 50% of the cyclobutanediol is the trans isomer.

References Cited

UNITED STATES PATENTS

| | | | |
|---|---|---|---|
| 3,380,939 | 4/1968 | Palm et al. | 260—873 |
| 3,313,777 | 4/1967 | Elam et al. | 260—860 |
| 3,342,785 | 9/1967 | Blanchard | 260—78.3 |

WILLIAM H. SHORT, Primary Examiner

E. WOODBERRY, Assistant Examiner

U.S. Cl. X.R.

260—47 X

PO-1050
(5/69)

UNITED STATES PATENT OFFICE
CERTIFICATE OF CORRECTION

Patent No. 3,639,503                    Dated February 1, 1972

Inventor(s) M. Matzner

It is certified that error appears in the above-identified patent and that said Letters Patent are hereby corrected as shown below:

Col. 11, line 19, "polyaceton blocks ar" should be --polylactone blocks are--.

Signed and sealed this 17th day of September 1974.

(SEAL)
Attest:

McCOY M. GIBSON JR.           C. MARSHALL DANN
Attesting Officer             Commissioner of Patents